(12) United States Patent  
Aihara et al.

(10) Patent No.: US 8,509,594 B2  
(45) Date of Patent: Aug. 13, 2013

(54) EDITING APPARATUS, EDITING METHOD, AND PROGRAM

(75) Inventors: Katsuhiko Aihara, Kanagawa (JP); Syuichi Shinada, Kanagawa (JP); Masami Tsubaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1226 days.

(21) Appl. No.: 11/899,076

(22) Filed: Sep. 4, 2007

(65) Prior Publication Data

US 2008/0056665 A1    Mar. 6, 2008

(30) Foreign Application Priority Data

Sep. 6, 2006   (JP) ................ P2006-241865

(51) Int. Cl.  
*H04N 9/80*    (2006.01)

(52) U.S. Cl.  
USPC .......................................... 386/248

(58) Field of Classification Search  
USPC ............. 386/239, 241, 248, 278, 279, 286, 386/326  
See application file for complete search history.

(56) References Cited

U.S. PATENT DOCUMENTS

| | | | |
|---|---|---|---|
| 5,051,845 A * | 9/1991 | Gardner et al. | 386/278 |
| 5,895,121 A * | 4/1999 | Grey et al. | 386/279 |
| 5,926,603 A | 7/1999 | Tanaka et al. | |
| 6,314,231 B1 | 11/2001 | Tanaka et al. | |
| 6,754,434 B2 * | 6/2004 | Fujisawa et al. | 386/278 |
| 2003/0202782 A1 | 10/2003 | Motohashi et al. | |
| 2006/0072901 A1 | 4/2006 | Ando et al. | |
| 2006/0104611 A1 * | 5/2006 | Gildred et al. | 386/83 |

FOREIGN PATENT DOCUMENTS

| | | |
|---|---|---|
| EP | 1 158 522 | 11/2001 |
| EP | 1 650 760 | 4/2006 |
| JP | 9 233374 | 9/1997 |
| JP | 2000 308001 | 11/2000 |
| WO | WO 01/18811 | 3/2001 |

OTHER PUBLICATIONS

Mackie Designs Inc.: "SDR 24/96—24 Track/24 Bit Digital Audio Hard Disk Recorder—Operation Guide" [Online] Mar. 2002, XP002495455 Retrieved from the Internet: URL://http://www.mackie.com/pdf/sdr2496_og.pdf> [retrieved on Sep. 10, 2008].

* cited by examiner

*Primary Examiner* — Tat Chio  
(74) *Attorney, Agent, or Firm* — Frommer Lawrence & Haug LLP; William S. Frommer; Ellen Marcie Emas

(57) ABSTRACT

Disclosed herein is an editing apparatus including: a recording control section, which, when a predetermined command is received, exercises recording control as a process for the received command; and a recording section configured to record data on a predetermined recording medium under control of the recording control section, wherein the recording control section judges whether the recording should finish at a time point of finishing the recording of the data, when the result of judgment indicates that the recording should finish, the recording control section controls the recording section so as to finish the recording, and when the result of judgment indicates that the recording should not finish, the recording control section controls the recording section so as to record a predetermined time period of data and finish the recording.

7 Claims, 10 Drawing Sheets

EDITING APPARATUS, EDITING METHOD, AND PROGRAM

CROSS REFERENCES TO RELATED APPLICATIONS

The present invention contains subject matter related to Japanese Patent Application JP 2006-241865 filed in the Japan Patent Office on Sep. 6, 2006, the entire contents of which being incorporated herein by reference.

BACKGROUND OF THE INVENTION

1. Field of the Invention

The present invention relates to an editing apparatus, editing method, and program, and more particularly to an editing apparatus, editing method, and program for editing a plurality of video images without recording a postroll.

2. Description of the Related Art

Edits may be made to clip necessary portions from a video recorded on a videotape or the like and splice them to create a new video, or insert a particular scene into an existing video.

FIG. 1 shows a typical configuration of an editing system that was used in the past. The editing system shown in FIG. 1 includes a reproduction VTR (Video Tape Recorder) 11, a recording VTR 12, and an editing controller 13. The editing system shown in FIG. 1 is configured for linear editing.

The reproduction VTR 11 reproduces video and audio that are recorded on a videotape (hereinafter simply referred to as video), and supplies them to the recording VTR 12. The editing controller 13 provides control over the start and end of a reproduction operation of the reproduction VTR 11 and the start and end of a recording operation of the recording VTR 12.

Editing operations performed by the editing system shown in FIG. 1 will now be described. For example, video A, video B, and video C may be clipped from video recordings on a material tape and spliced in order of video B, video A, video C to create an edited tape (complete package tape), as shown in FIG. 2. When an edit is to be made to sequentially dub necessary portions of the material tape as mentioned above, the following process is performed by the editing system shown in FIG. 1. The term "complete package" refers to AV (Audio and Video) data that is completed as a television broadcast after being subjected to audio and video editing and finished, for instance, by superimposing text and drawing on video.

First of all, the reproduction VTR 11 reproduces video B on the material tape and supplies it to the recording VTR 12. The recording VTR 12 then records video B. Next, the reproduction VTR 11 reproduces video A and supplies it to the recording VTR 12. The recording VTR 12 then records video A. Next, the reproduction VTR 11 reproduces video C and supplies it to the recording VTR 12. The recording VTR 12 then records video C.

As reproduction and recording operations are repeated as described above, a complete package tape on which video B, video A, and video C are recorded in the order named is created. The editing controller 13 exercises control to perform the above reproduction and recording operations by issuing commands to the reproduction VTR 11 and recording VTR 12. To perform the above editing operation, it is necessary that the reproduction VTR 11 and recording VTR 12 maintain the same timing.

In the editing system shown in FIG. 1, the editing controller 13 controls the reproduction VTR 11 and recording VTR 12. In an alternative configuration, however, either the reproduction VTR 11 or the recording VTR 12 may double as the editing controller 13.

Another form of editing is an insert edit. An insert edit is an editing operation that is performed to create a complete package tape, for instance, by inserting video A into a video recording on a recorded tape as shown in FIG. 3. When an insert edit is performed, video A overwrites a part of the video recording on the recorded tape.

When an insert edit is to be performed, a recorded tape on which a video is recorded is set in the recording VTR 12 while a videotape on which video A is recorded is set in the reproduction VTR 11. Video A is reproduced by the reproduction VTR 11, supplied to the recording VTR 12, and written over a portion of the recorded tape that is specified for an insert edit.

An assemble edit, which is another form of editing, will now be described. An assemble edit is an editing operation that is basically performed to sequentially record videos onto a blank videotape (a videotape on which no video is recorded). An assemble edit will be described with reference to FIG. 4.

At time point 1, nothing is recorded on the videotape. This blank videotape is set in the recording VTR 12. At time point 2, video A is recorded onto the blank videotape. At time point 2, a videotape on which video A is recorded is set in the reproduction VTR 11 and reproduced to supply video A to the recording VTR 12. In the recording VTR 12, video A is recorded onto the blank videotape.

To record video A as described above, the editing controller 13 controls, for instance, the start of reproduction and recording operations by issuing commands to the reproduction VTR 11 and recording VTR 12.

At time point 3, video B is additionally recorded onto the videotape on which video A is already recorded. For recording of video B, the editing system performs the same process as for recording of video A. Further, at time point 4, video C is additionally recorded onto the videotape on which video A and video B are already recorded. For recording of video C, the editing system also performs the same process as for recording of video A and video B.

The process for an assemble edit will now be described in detail with reference to FIG. 5. At time point 1, video X is recorded on a videotape. When FIG. 4 was used for explanation purposes, the employed videotape was described as a "blank videotape." In reality, however, a predetermined signal is recorded at the beginning of a videotape. The predetermined signal is, for instance, a color bar or other test signal.

Video A is recorded onto the videotape on which a test signal is recorded as indicated by the drawing of time point 1. Recording of video A begins at the IN point. When recording of video A begins at the IN point, reproduction starts after the videotape is rewound (prerolled) to a point slightly before the IN point. As described above, reproduction starts at a point slightly before the IN point, at which recording begins, for the purpose of acquiring a section necessary for stabilizing a videotape transport operation and causing the reproduction VTR 11 and recording VTR 12 to maintain the same timing.

When the videotape is reproduced to reach the IN point (time point 3), recording of video A begins.

The videotape on which video X is recorded is set in the recording VTR 12. The recording VTR 12 starts a reproduction operation from a point slightly before the IN point of the videotape. While the videotape is reproduced, the videotape transport operation stabilizes and the recording VTR 12 begins to keep the same timing as the reproduction VTR 11. When the IN point is reached, the reproduction VTR 11 reproduces video A and supplies it to the recording VTR 12. The recording VTR 12 then starts recording video A.

The editing controller 13 reproduces the videotape until the IN point is reached. When the IN point is reached, the editing controller 13 controls the recording VTR 12 so as to switch from reproduction to recording. When the IN point is reached, the editing controller 13 also controls the reproduction VTR 11 so as to start the reproduction of video A.

When the recording of video A is continued until the OUT point (the end of a desired recording section) for finishing the recording of video A is reached, the recording continues (time point 4). The section between the OUT point and a point at which the recording actually ends is referred to as a postroll section. The postroll section is, for instance, a period of two seconds.

The postroll section is used to prepare for the next editing operation. The postroll section is obtained because an extra section is necessary. Even when the OUT point is reached, the recording VTR 12 continues its recording operation as described above. The recording VTR 12 continues its recording operation until it passes through the postroll section.

The process performed during a period between time point 2 and time point 5 is executed because the editing controller 13 issues an "AUTO EDIT" command to the recording VTR 12.

When video B is to be recorded subsequently to video A, the OUT point is regarded as the IN point as indicated by the drawing of time point 6. The recording of video B begins at that IN point. More specifically, reproduction starts at a point before the OUT point of video A (the IN point of video B), and the recording of video B starts when the IN point is reached.

The postroll section is overwritten by a subsequent editing operation as described above and does not remain on a complete package tape, which is eventually obtained.

Editing operations described above are performed by the editing system that is shown in FIG. 1 and configured for linear editing. However, the editing system configured for nonlinear editing, which is shown in FIG. 6, also performs the editing operations described above in basically the same manner.

The editing system shown in FIG. 6 performs nonlinear edits. It includes a VTR 21 and a nonlinear editing (NLE) apparatus 22. The VTR 21 reproduces a videotape on which video and audio are recorded, and supplies the reproduced video and audio to the nonlinear editing apparatus 22. The nonlinear editing apparatus 22 includes, for instance, a PC (Personal Computer), and causes a built-in hard disk drive (HDD) to acquire the video supplied from the VTR 21.

The hard disk drive is randomly accessible. When, for instance, an editing operation is to be performed by clipping necessary portions from a certain video and recording the clipped portions in an altered sequence as described with reference to FIG. 2, the use of the hard disk drive makes the editing operation easy because it does not have to perform a tape rewind or fast-forward operation in marked contrast to the use of a videotape.

The nonlinear editing apparatus 22 edits the video recorded on the built-in hard disk drive or the like to create a complete package. The created complete package is supplied to the VTR 21 and recorded onto a videotape that is set in the VTR 21.

As described above, a process is performed by allowing the VTR 21 to supply a material to the nonlinear editing apparatus 22 (step 1), letting the nonlinear editing apparatus 22 perform an edit to create a complete package (step 2), and having the nonlinear editing apparatus 22 supply the created complete package to the VTR 21 and letting the VTR 21 record the complete package (step 3). Steps 1 and 3 are performed by using the same commands as for linear editing.

Since the same control commands for linear editing and nonlinear editing, it is possible to accurately acquire a desired section of the material (accurately supply the video of the desired section from the VTR 21 to the nonlinear editing apparatus 22 for recording purposes) and accurately record a complete package on a videotape (accurately supply the complete package from the nonlinear editing apparatus 22 to the VTR 21 and accurately record the complete package on the videotape set in the VTR 21).

When the complete package is supplied from the nonlinear editing apparatus 22 to the VTR 21 and recorded in the VTR 21, the AUTO EDIT command may be used. The process performed when the AUTO EDIT command is used will now be described with reference to FIG. 7.

At time point 1, video X, which is a color bar or other test signal, is already recorded on a videotape that is to be used for recording new video, and such a videotape is set in the VTR 21. When the AUTO EDIT command is executed at time point 2, the nonlinear editing apparatus 22 supplies complete package A to the VTR 21. Further, subsequently to video X, the VTR 21 records complete package A between the IN point and the OUT point and then continues to perform a recording process for a postroll section, which begins at the OUT point. For example, a black image signal is recorded in the postroll section whose recording begins at the OUT point.

When the nonlinear editing apparatus 22 creates a plurality of complete packages and splices them together to create a new complete package, for example, complete package B is recorded subsequently complete package A as indicated by the drawing of time point 3. The leading end of complete package B overwrites the postroll section that was created when complete package A was recorded. Therefore, no postroll section exists between complete package A and complete package B (time point 3).

The postroll section is overwritten by the next complete package as described above. Therefore, the newly created complete package does not contain a postroll section. As a result, a complete package is created by properly splicing the complete packages together. However, a postroll section exists at a trailing end of complete package B, which was written at last.

The above editing operation is performed, for instance, by a currently marketed editing controller (Model RM-280, manufactured by Sony Corporation).

SUMMARY OF THE INVENTION

The foregoing description assumes that a videotape is used as the recording medium (a VTR is used for recording a complete package). In recent years, however, recording media other than the videotape have been used as well. For example, video cameras, reproduction apparatuses, recording apparatuses, and other apparatuses that use a disk-shaped recording medium are going to become widespread. Even when a recording medium other than the videotape is used, the editing operations described above are performed in the same manner. Further, the user expects that the above editing operations may be performed in the same manner even when a recording medium other than the videotape is used.

However, the comparison between a tape-shaped recording medium and a disk-shaped recording medium reveals that they have their own features. In some cases, these two types of recording media may not be used in the same manner. When, for instance, a disk-shaped recording medium is used, reproduction and recording operations are performed as indicated in FIG. 8.

When a recording instruction is issued at time t1 in a situation where video data recorded on a disk-shaped recording medium is being reproduced, recording starts at point P2 at which video data is already recorded. In other words, even when point P1 is reproduced at time t1, recording does not start at point P1 but starts at point P2, which is a trailing end of the previously recorded video data.

In other words, when a disk-shaped recording medium is used, a recording operation is conducted without overwriting. When control is exercised to avoid an overwriting operation as described above, it is possible to prevent previously recorded video data from being inadvertently overwritten (deleted). Further, if the video to be recorded is encountered while previously recorded video data is reproduced and observed, such a video can be recorded promptly (the recording of such a video can be started without a delay).

When, for instance, a recording operation is started while a video recorded on a videotape is being reproduced, recording begins at a point of the videotape that is currently reproduced. If any recorded video exists in such an instance, it is overwritten. It means that the video recorded subsequently to that point will be lost.

In another situation, recording begins after the videotape is fast-forwarded to a position at which no video is recorded. In this instance, no recording can take place while the videotape is being fast-forwarded. Therefore, the user may fail to record a desired video (miss a chance to record a desired video).

On the other hand, a disk-shaped recording medium is randomly accessible unlike a videotape recording medium. Therefore, the use of a disk-shaped recording medium makes it possible to quickly switch its operation from reproduction to recording without deleting previously recorded data.

When a disk-shaped recording medium is used, new data is recorded without deleting previously recorded data as described with reference to FIG. 8. The process performed when, for instance, an assemble edit is made as described with reference to FIG. 7 through the use of a disk-shaped recording medium for which control is exercised as described above will now be described.

The process performed for splicing a plurality of complete packages to create one complete package with a disk-shaped recording medium is shown in FIG. 9. Before time point 2', which is shown in FIG. 9, the AUTO EDIT command was executed once to record complete package A. This state is equivalent to a state (time point 2) in which complete package A is recorded on a videotape as shown in FIG. 7. In other words, a postroll section is recorded even when a disk-shaped recording medium is used for editing.

When the AUTO EDIT command is executed to record complete package B after the recording of complete package A, the recording of complete package B starts after a postroll section as indicated by the drawing of time point 3' in FIG. 9. In this instance, the postroll section remains as is without being overwritten. The reason is that control is exercised not to overwrite previously recorded data, as described with reference to FIG. 8, if recording starts during reproduction when a disk-shaped recording medium is used.

A process for recording complete package B subsequently to complete package A is started by reproducing complete package A. When the OUT point of complete package A (the IN point of complete package B) is reached, recording starts. However, the resulting state is the same as described with reference to FIG. 8 because the process switches from reproduction to recording. Consequently, control is exercised not to overwrite previously recorded data. Eventually, the recording position moves to the end of the postroll section, and recording starts with the end point of the postroll section regarded as the IN point of complete package B.

Since the above process is performed, the postroll section remains between complete package A and complete package B. Even when the editing personnel performs an edit with a view toward obtaining a video that is a contiguous sequence of complete packages A and B, the resulting complete package contains a black image or other postroll section image, which is inserted between complete packages A and B.

If the postroll section remains intact as described above, the video supplied to the editing personnel differs from the expectation of the editing personnel.

In other words, when the AUTO EDIT command is used for editing in the same manner as for videotape editing, the video obtained from videotape editing may not always be obtained when a disk-shaped recording medium is used. Therefore, when a disk-shaped recording medium is used, the editing personnel cannot follow the same editing procedure as for videotape editing. As a result, the editing personnel may become confused or feel bothered.

The present invention has been made in view of the above circumstances and makes it possible to splice a plurality of videos without inserting an unnecessary video between them.

According to an embodiment of the present invention, there is provided an editing apparatus including a recording control section and a recording section. Upon receipt of a predetermined command, the recording control section exercises recording control as a process for the received command. The recording section is configured to record data on a predetermined recording medium under control of the recording control section. The recording control section judges whether the recording should finish at a time point of finishing the recording of the data. When the result of judgment indicates that the recording should finish, the recording control section controls the recording section so as to finish the recording. When the result of judgment indicates that the recording should not finish, the recording control section controls the recording section so as to record a predetermined time period of data and finish the recording.

The predetermined command may be an AUTO EDIT command.

The predetermined recording medium may be a disk-shaped recording medium.

The predetermined time period of data is postroll data.

The recording control section may judge in accordance with user-entered setup information whether the recording should finish, and include a user interface for allowing a user to enter setup information.

According to another embodiment of the present invention, there is provided an editing method for use in an editing apparatus equipped with a recording section for recording data onto a predetermined recording medium. The editing method includes a recording control step of, when a predetermined command is received, controlling a recording operation of the recording section as a process for the received command. The recording control step includes the steps of judging whether the recording should finish at a time point of finishing the recording of the data, and controlling the recording section so as to finish the recording when the result of judgment indicates that the recording should finish, or record a predetermined time period of data and finish the recording when the result of judgment indicates that the recording should not finish.

According to still another embodiment of the present invention, there is provided a program for a computer that controls a recording section to record data onto a predetermined recording medium. The program includes a recording control step of, when a predetermined command is received, controlling a recording operation of the recording section as a process for the received command. The recording control step includes the steps of judging whether the recording should finish at a time point of finishing the recording of the data, and controlling the recording section so as to finish the recording when the result of judgment indicates that the recording should finish, or record a predetermined time period of data and finish the recording when the result of judgment indicates that the recording should not finish.

When data is to be recorded onto a predetermined recording medium, the editing apparatus, editing method, and program according to an embodiment of the present invention are used to judge at a time point of finishing the recording of the data whether the recording should immediately stop or continue for a predetermined section and then finish, and perform a recording process in accordance with the result of judgment.

An embodiment of the present invention enables the user to choose whether or not to include a postroll section when a plurality of videos are to be spliced together. If the user chooses not to include the postroll section, the videos can be spliced together without including the postroll section.

DETAILED DESCRIPTION OF THE PREFERRED EMBODIMENTS

Embodiments of the present invention will now be described with reference to the accompanying drawings.

Figure 10:
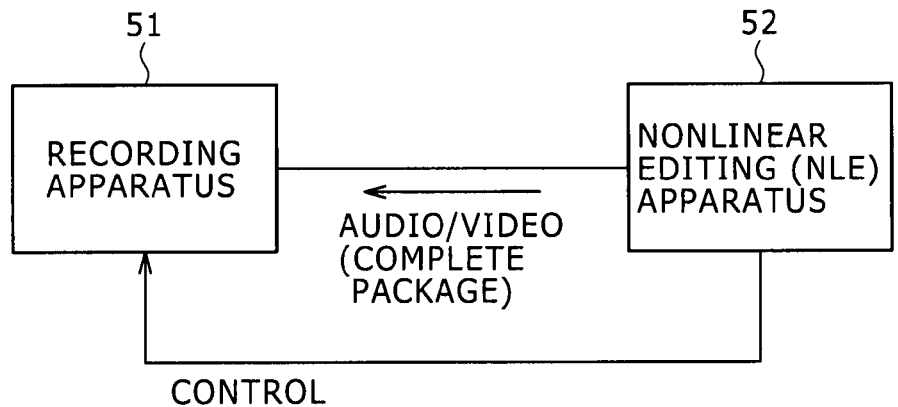
FIG. 10 shows the configuration of an editing system according to an embodiment of the present invention.

FIG. 10 shows the configuration of an editing system to which the present invention is applied. The editing system shown in FIG. 10 includes a recording apparatus 51 and a nonlinear editing apparatus 52. In the editing system shown in FIG. 10, the nonlinear editing apparatus 52 records video data onto a built-in recording medium such as a hard disk drive (HDD), and edits the recorded video data to create complete package data.

Even when the description in this document indicates, for instance, that a procedure is performed to "edit video data" or "record video data," it means that the procedure is performed to edit or record audio data attached to the video data together with the video data. In other words, when the description indicates that "video data is to be edited" or "video data is to be recorded," it means that both the video data and audio data are to be edited or recorded. It does not mean that the editing or recording target is not limited to the video data.

After a complete package is created by the nonlinear editing apparatus 52, it is supplied to the recording apparatus 51 and recorded onto a predetermined recording medium that is set in the recording apparatus 51.

The nonlinear editing apparatus 52 records video data onto a built-in recording medium. However, the video data to be recorded may be supplied from the recording apparatus 51. More specifically, the recording apparatus 51 may incorporate a reproduction function, exercise the reproduction function to reproduce the video data, and supply the video data to the nonlinear editing apparatus 52 for recording purposes.

Figure 11:
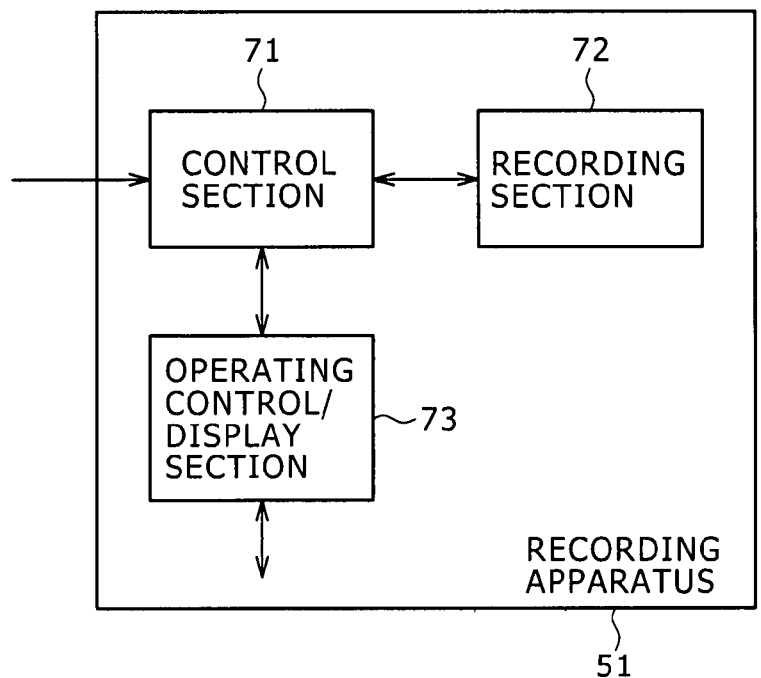
FIG. 11 shows a typical internal configuration of a recording apparatus.

FIG. 11 shows a typical internal configuration of the recording apparatus 51. The recording apparatus 51 includes a control section 71, a recording section 72, and an operating control/display section 73.

The control section 71 includes a CPU (Central Processing Unit) and controls various sections of the recording apparatus 51. Upon receipt of the AUTO EDIT command from the nonlinear editing apparatus 52, the control section 71 controls a recording operation of the recording section 72 to perform the process to be executed in response to the AUTO EDIT command. The control section 71 also monitors the status of the recording section 72 for the purpose of exercising such control.

The recording section 72 records video data onto a predetermined recording medium. For example, a disk-shaped recording medium is used as the predetermined recording medium.

The operating control/display section 73 includes an operating control section, which includes, for instance, a keyboard and a mouse; and a display section, which includes, for instance, a display that performs a display operation in accordance with an operation of the operating control section. The operating control/display section 73 may be made of a touch panel or the like. If the operating control/display section 73 is made of a touch panel or the like, the operating control section and display section are constructed of one piece.

Figure 12:
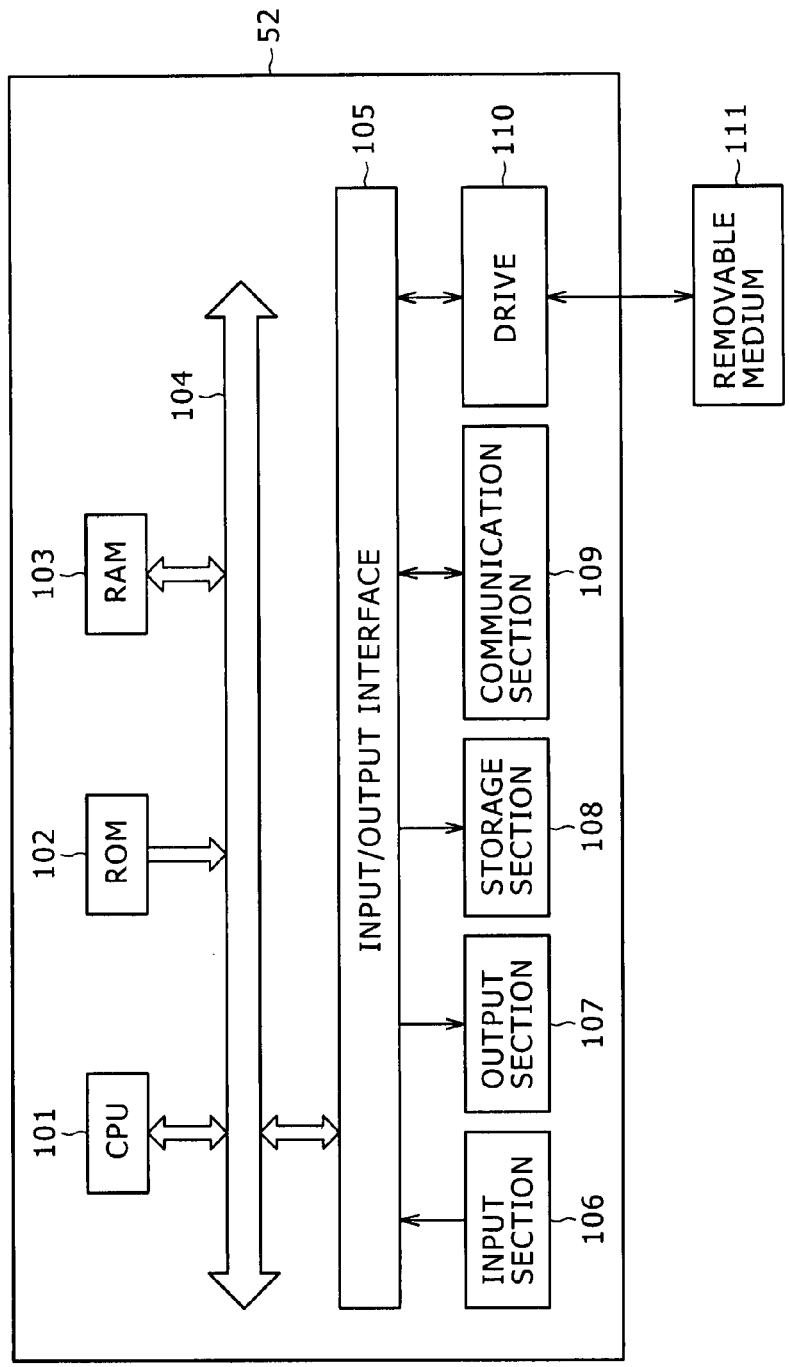
FIG. 12 shows a typical internal configuration of a nonlinear editing apparatus.

FIG. 12 shows a typical internal configuration of the nonlinear editing apparatus 52. The nonlinear editing apparatus 52 may be made of a personal computer. The configuration shown in FIG. 12 is a typical configuration of such a personal computer.

A CPU 101 performs various processes in accordance with a program that is stored in a ROM (Read Only Memory) 102 or a storage section 108. A RAM (Random Access Memory) 103 stores as needed data and a program that is to be executed by the CPU 101. The CPU 101, ROM 102, and RAM 103 are interconnected via a bus 104.

The CPU 101 is also connected to an input/output interface 105 via the bus 104. The input/output interface 105 is connected to an input section 106 and an output section 107. The input section 106 includes, for instance, a keyboard, a mouse, and a microphone. The output section 107 includes, for instance, a display and a speaker. The CPU 101 performs various processes in accordance with instructions that are input from the input section 106. Further, the CPU 101 outputs the result of processing to the output section 107.

The storage section 108, which is connected to the input/output interface 105, includes, for instance, a hard disk and stores various data and a program that is to be executed by the CPU 101. Further, the storage section 108 stores video data that is supplied from the recording apparatus 51. A communication section 109 communicates with an external apparatus via a network such as the Internet or local area network.

Further, a program can be acquired via the communication section 109 and stored in the storage section 108.

When a magnetic disk, optical disk, magnetooptical disk, semiconductor memory, or other removable medium 111 is inserted into a drive 110 that is connected to the input/output interface 105, the drive 110 drives the inserted removable medium and acquires the program and data recorded on the removable medium. The acquired program and data are transferred as needed to the storage section 108 for storage purposes.

An edit that is performed by the editing system shown in FIG. 10 will now be described. A process for performing an assemble edit in which a plurality of videos (complete packages) are spliced together to create a new video (complete package) will be described as an example.

Figure 5:
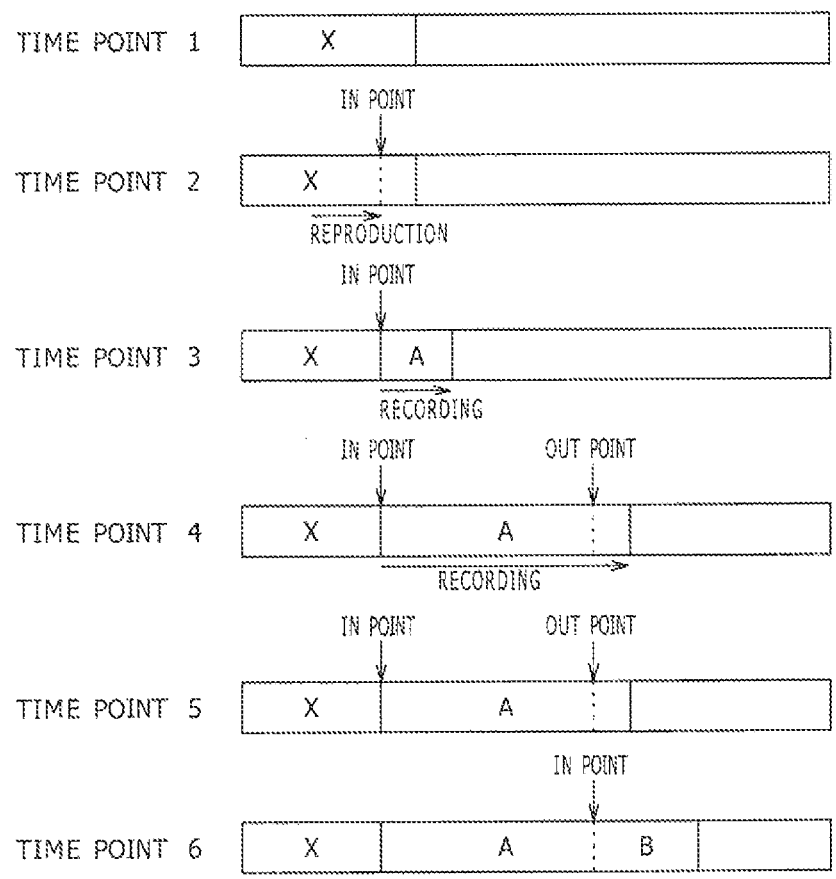
FIG. 5 illustrates an editing process.
Figure 6:
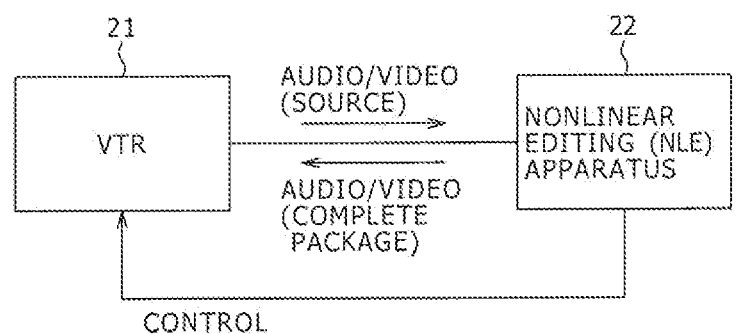
FIG. 6 shows another typical configuration of a previously used editing system.
Figure 7:
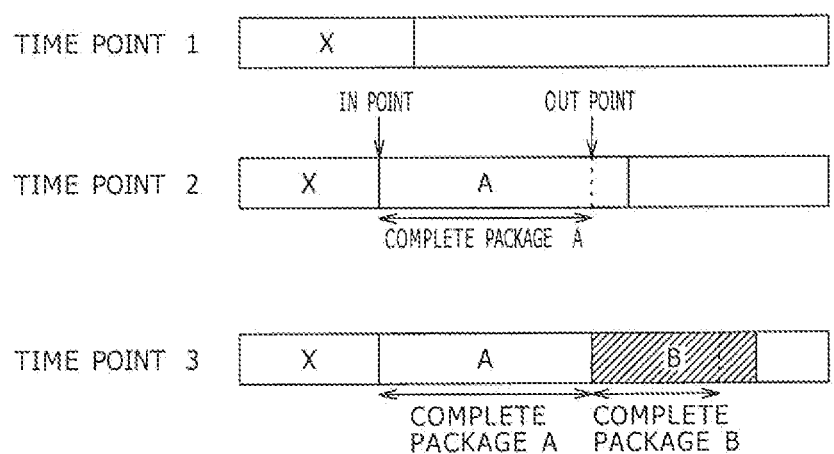
FIG. 7 illustrates an editing process.
Figure 8:
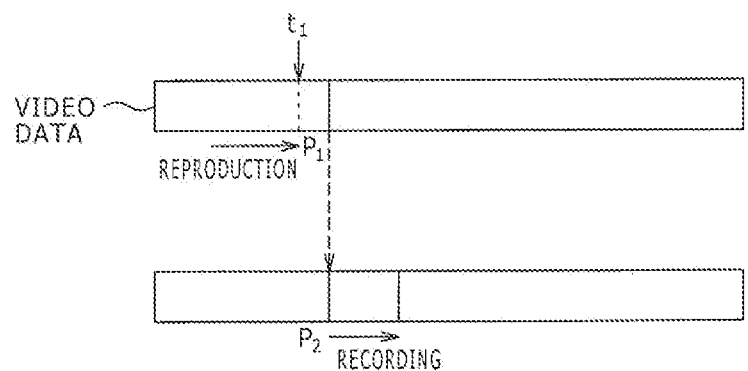
FIG. 8 illustrates a process that is performed to switch from reproduction to recording.
Figure 9:
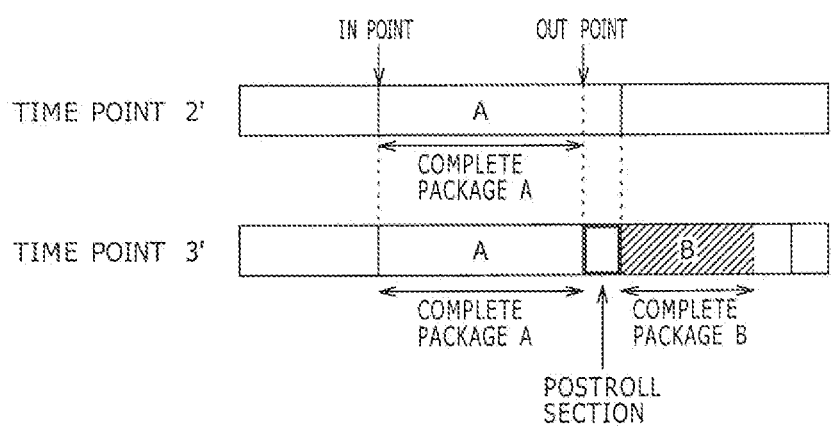
FIG. 9 shows how a postroll section remains.

Although an assemble edit was described with reference to FIGS. 5, 7, and 9, a brief additional explanation will be given with reference again to the same figures.

Referring again to FIG. 5, video X is recorded on a videotape as a test signal at time point 1. When video A is to be recorded onto the videotape on which the test signal is recorded, the AUTO EDIT command is issued to start the recording of video A at the IN point.

Even when the OUT point for finishing the recording of video A (the end of the section to be recorded) is reached after the recording of video A is continued, the recording continues for the postroll section (time points 3 and 4). The postroll section is equivalent, for instance, to a period of 2 seconds.

When the AUTO EDIT command is subsequently issued to record video B, the recording is performed while regarding the OUT point of video A as the IN point of video B. In other words, the postroll section created when video A was recorded is deleted when video B overwrites it. As a result, the obtained video is a contiguous sequence of video A and video B.

The above editing process is generally performed when a videotape or other tape-shaped recording medium is used. When the AUTO EDIT command is issued during the use of a disk-shaped recording medium, the same process is performed to splice video A and video B. However, if video A and video B are recorded onto a disk-shaped recording medium by performing the same process, a postroll section exists between video A and video B as explained with reference to FIG. 9.

The reason is that when data is to be recorded onto a disk-shaped recording medium, the recording is performed by observing a rule of not overwriting previously recorded data.

When video A and video B are recorded onto a disk-shaped recording medium, there is no problem if the editing personnel has intended to create a video that contains a postroll section between video A and video B. However, if the editing personnel has intended to create the same video as the video recorded on a tape-shaped recording medium, that is, to create a video that contains no postroll section between video A and video B, the obtained editing result differs from the expectation of the editing personnel.

To avoid the above inconvenience, control is exercised so that no postroll section exists between a plurality of videos even when an edit is to be performed to record the plurality of videos onto a disk-shaped recording medium.

Figure 13:
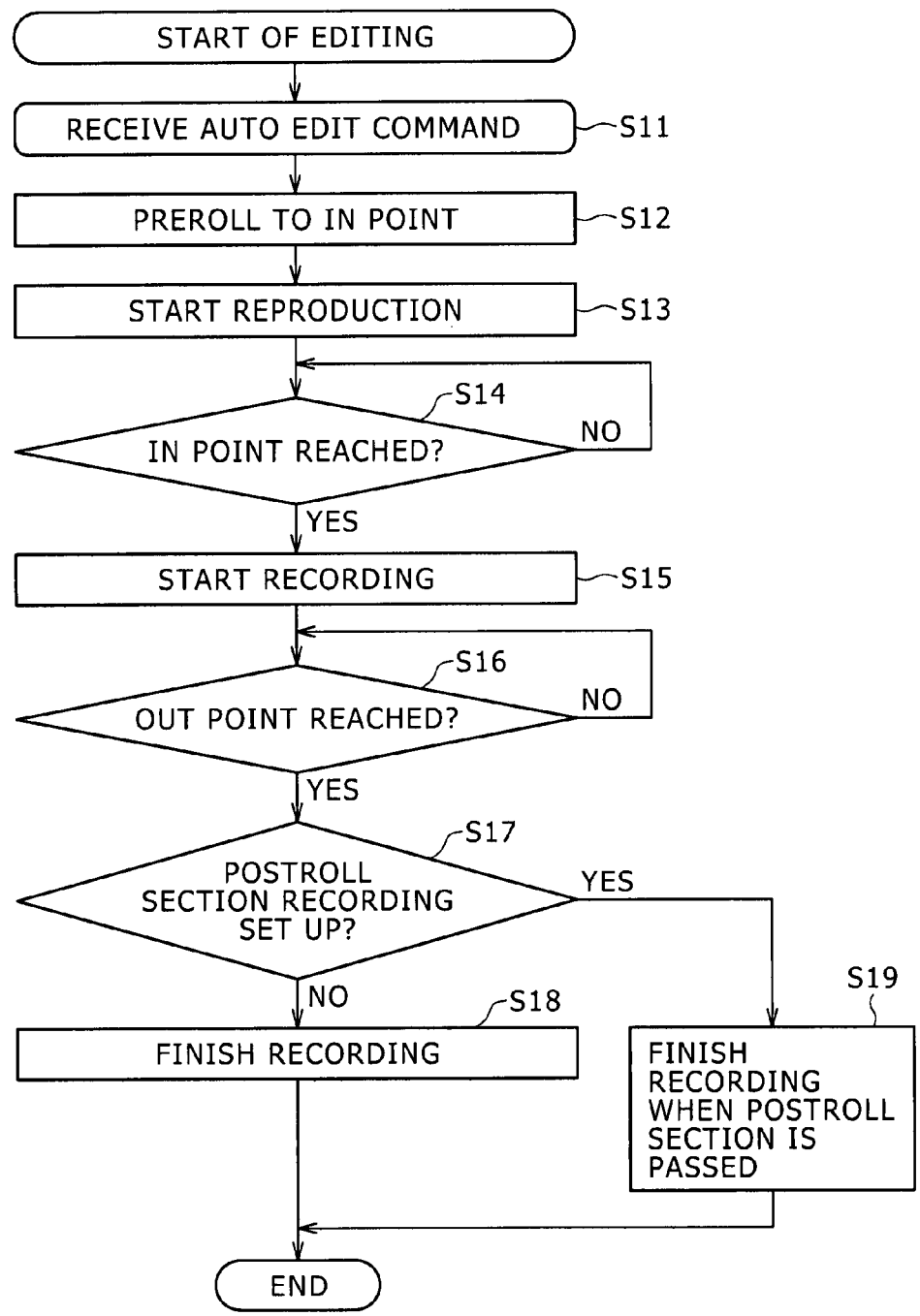
FIG. 13 is a flowchart illustrating an operation of the recording apparatus.

A process performed by the editing system to exercise such control or, more particularly, a process that the recording apparatus 51 performs to achieve the purpose, will now be described with reference to FIGS. 13 and 14. A flowchart in FIG. 13 shows a sequence of operations that are performed when the AUTO EDIT command is received by the recording apparatus 51 (a sequence of operations that are invoked by a single issuance of the AUTO EDIT command).

In step S11, the control section 71 (FIG. 11) of the recording apparatus 51 receives the AUTO EDIT command from the nonlinear editing apparatus 52. When the AUTO EDIT command is received, it is assumed that the video recorded on the recording medium set in the recording section 72 is video A as indicated as the status of step S11 in FIG. 14. In other words, the prevailing state is such that the AUTO EDIT command has been executed in relation to video A for recording purposes or that a color bar or other video signal is recorded at the beginning.

A case where video B is recorded after the AUTO EDIT command is received in a state where video A is recorded on the recording medium will be described as an example.

Upon receipt of the AUTO EDIT command, the control section 71 performs step S12 to control the recording section 72 to preroll it to the IN point. In step S13, reproduction begins.

The IN point is a position at which the recording begins. When the recording section 72 prerolls to the IN point, it reaches a point that is positioned before the IN point by a desired period of time (e.g., positioned several seconds before the IN point). For example, reproduction begins at a position several seconds before the IN point at which the recording of video B starts, as indicated as the status of step S12 in FIG. 14.

When the recording section 72 starts the reproduction under control of the control section 71, step S14 is followed to judge whether the IN point is reached. When the reproduction of video A reaches the IN point (that is, the trailing end of video A is reproduced) as indicated as the status of step S13 in FIG. 14, it is judged that the IN point is reached, and processing proceeds to step S15. The control section 71 monitors the status of the recording section 72 and judges whether the IN point is reached. The control section 71 repeatedly performs this operation until it judges that the IN point is reached.

When the obtained judgment indicates that the IN point is reached, step S15 is followed to start recording. The control section 71 begins to exercise control so that the recording section 72 stops its reproduction operation and proceeds to record video B, which is supplied from the nonlinear editing apparatus 52. In this instance, the recording of video B begins at the IN point as indicated as the status of step S15 in FIG. 14. After the recording of video B is started, step S16 is performed to judge whether the OUT point is reached. The OUT point is a position at which the recording is terminated.

Figure 1:
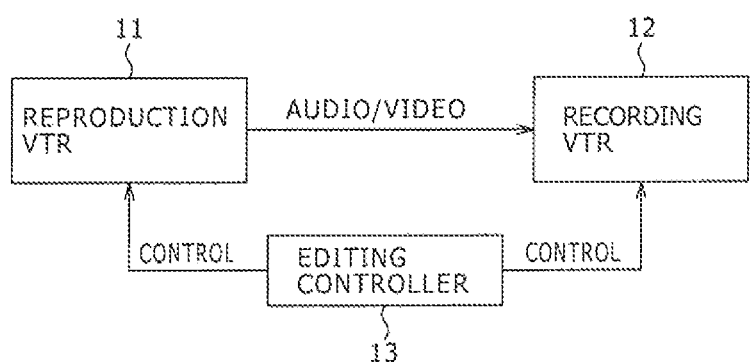
FIG. 1 shows a typical configuration of a previously used editing system.
Figure 2:
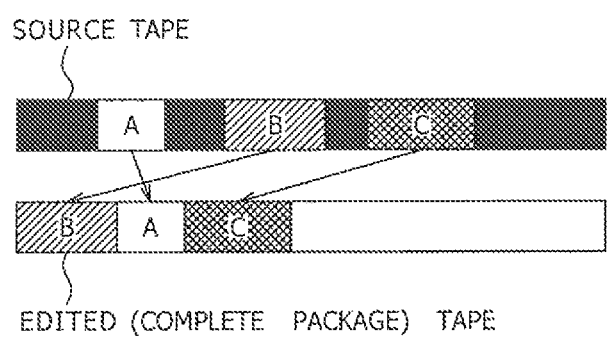
FIG. 2 illustrates an editing process.
Figure 3:
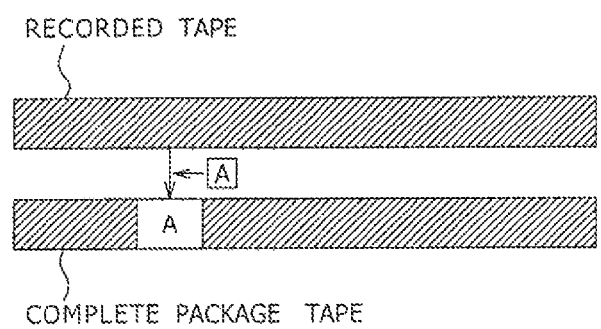
FIG. 3 illustrates an editing process.
Figure 4:
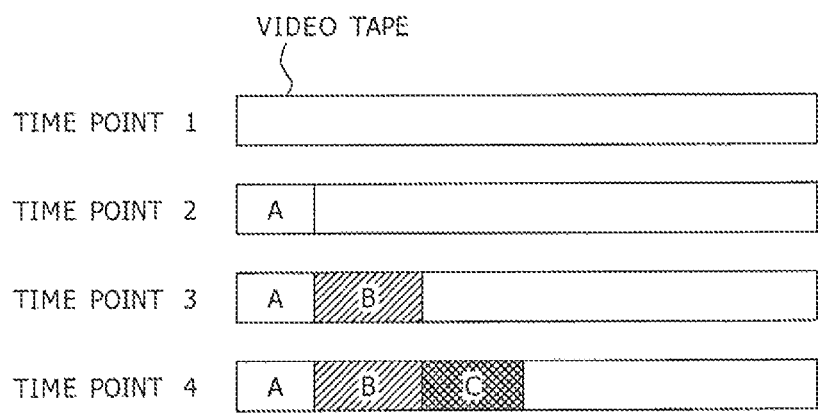
FIG. 4 illustrates an editing process.

As indicated as the status of step S16 in FIG. 1, the OUT point is reached after the recording of video B is continued. The control section 71 monitors the status of the recording section 72 and judges whether the OUT point is reached. The control section 71 repeatedly performs this operation until it judges that the OUT point is reached. When the OUT point is reached, step S17 is performed to judge whether the recording of a postroll section is set up.

To judge whether the recording of a postroll section is set up, for example, the control section 71 checks setup information. The setup information is stored in a storage section (not shown) for storing data that is necessary for the control section 71 to perform various processes. The setup information is generated and stored in accordance with user instructions.

Figure 15:
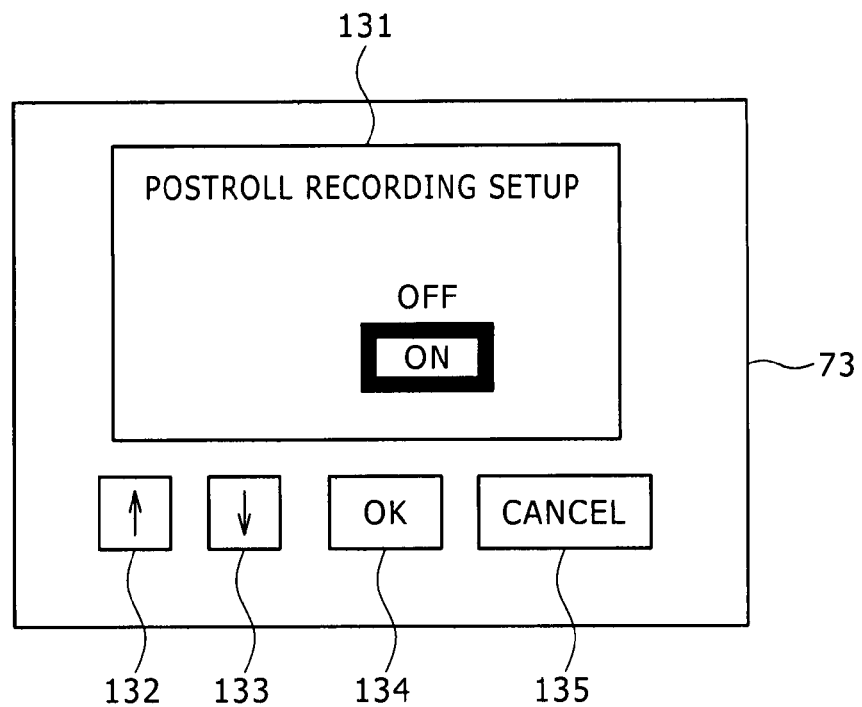
FIG. 15 shows an example of a screen that appears on a display section.

A user interface (UI), which permits the user to set up information that specifies whether or not to set up the recording of a postroll section, will now be described. FIG. 15 shows an example of a screen that appears on the operating control/ display section 73. The screen shown in FIG. 15 displays an option display area 131, which displays options for specifying whether or not to record a postroll section; buttons 132, 133, which are operated to select an option displayed in the option display area 131; a button 134, which is operated to enable a selected option; and a button 135, which is operated to cancel the option selection.

The option display area 131 displays two options: "ON" and "OFF." The "ON" option performs setup so as to record a postroll section. The "OFF" option performs setup so as not to record the postroll section. Buttons 132 and 133 are operated to select the "ON" or "OFF" option. These buttons 132 to 135 are configured so that they can be selected by operating a mouse or the like. Alternatively, these buttons may be directly operated from a touch panel or the like.

When an option is selected from the option display area 131, it is displayed in such a manner that it can be distinguished from an unselected option. In the example shown in FIG. 14, the word "ON" is enclosed by a rectangle to notify the user that the "ON" option is selected.

Button 134 is operated to enable a selected option. On the other hand, button 135 is operated to terminate the process without saving the option selection.

When button 134 is operated, the setup information about the currently selected option is saved. If, for instance, button 134 is operated while the "OFF" option, which does not record the postroll section, is selected, the control section 71 sets up and stores setup information that chooses not to record the postroll section.

The above setup procedure is performed before the process indicated in the flowchart in FIG. 13 begins, that is, before the AUTO EDIT command is issued. The setup procedure for specifying whether or not to record the postroll section can be performed before judgment in step S17.

The setup information entered from the screen shown in FIG. 15 may remain effective until it is changed or may be updated each time the AUTO EDIT command is received. For example, the setup information entered before the recording of video A may be continuously used for the recording of video B or updated for the recording of video B.

Returning to the flowchart shown in FIG. 13, the control section 71 references stored setup information in step S17 and judges whether the recording of a postroll section is set up. If the judgment result obtained in step S17 indicates that the recording of the postroll section is not set up, processing proceeds to step S18. In step S18, the recording process terminates because the OUT point is reached and the setup information indicates that the postroll section is not to be recorded. The control section 71 controls the recording section 72 so as to stop the recording.

Figure 14:
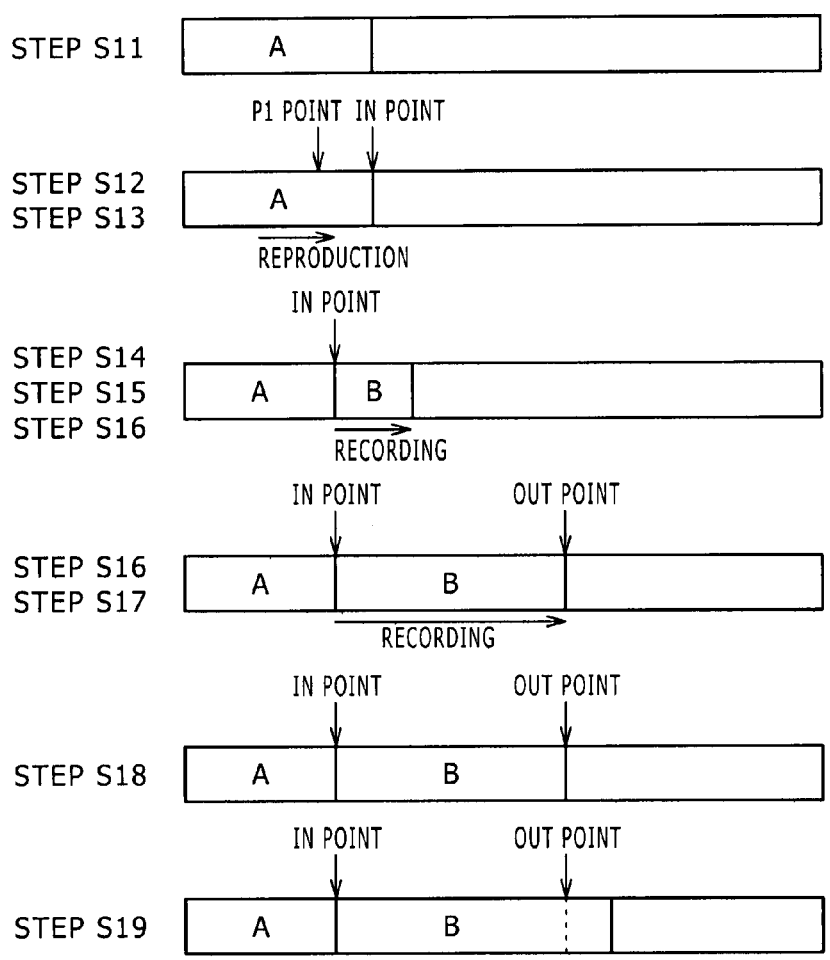
FIG. 14 illustrates an editing process.

If the recording is finished without recording the postroll section as described above, a complete package is created as indicated as the status of step S18 in FIG. 14. As shown in FIG. 14, the recording is finished at the OUT point because the postroll section is not to be recorded. When video C is to be spliced to the above-mentioned created complete package, recording is performed with the OUT point of video B regarded as the IN point of video C. Therefore, the resulting video is such that no postroll section is inserted between video B and video C.

If, on the other hand, the judgment result obtained in step S17 indicates that the recording of the postroll section is set up, processing proceeds to step S19. In step S19, the recording process terminates after recording the postroll section because the OUT point is reached and the setup information indicates that the postroll section is to be recorded.

If the recording is finished after the postroll section is recorded as described above, a complete package is created as indicated as the status of step S19 in FIG. 14. To record the postroll section, the recording does not finish until a recording operation is performed for a predetermined number of seconds after the OUT point as indicated in FIG. 14.

If, for instance, a disk-shaped recording medium is used, the recording finishes when a predetermined time period of data is recorded after the OUT point (i.e., the recording process terminates when the data prepared for the postroll section is written onto the recording medium). If a tape-shaped recording medium is used, the recording continues for a predetermined time period to record the predetermined time period of data and then terminates.

As described above, the present embodiment enables the user to specify whether or not to record the postroll section. Therefore, even when an edit is performed with a disk-shaped recording medium, it is possible to create a complete package that has a contiguous sequence of a plurality of videos (complete packages). Further, if the user completes a procedure for specifying whether or not to record the postroll section, the user can create a desired video in the same manner as for performing an edit with a videotape or other tape-shaped recording medium.

The embodiment described above assumes that the editing system includes the nonlinear editing apparatus 52. However, the present invention can also be applied to an editing system having an editing apparatus that provides linear editing.

The above embodiment has been described by using an example in which video is edited. However, the present invention is also applicable to a case where audio is edited.

A series of processes described above can be performed not only by hardware but also by software. When the series of processes is to be performed by software, the programs constituting the software are installed from a program storage medium onto a computer built in dedicated hardware or a general-purpose personal computer or other computer that can execute various functions when various programs are installed.

As shown in FIG. 12, the program storage medium storing programs that are to be installed on a computer and rendered computer-executable is, for instance, the removable medium 111, which is a package medium such as a magnetic disk (flexible disk included), an optical disk (CD-ROM (Compact Disc Read Only Memory) and DVD (Digital Versatile Disc) included), a magnetooptical disk (MD (Mini-Disc) included), or a semiconductor memory, the ROM 102 that stores a program temporarily or permanently, or a hard disk that constitutes the storage section 108. The programs are stored on the program storage medium as needed via the communication section 109, which is a router, modem, or other interface, by using a wired or wireless communication medium such as a local area network, the Internet, or a digital satellite broadcast.

In this document, the steps for writing the programs to be stored on the program storage medium not only include processes that are performed in a described chronological order but also include processes that are performed parallelly or individually and not necessarily in chronological order.

The term "system," which is used in this document, represents an aggregate of a plurality of devices.

It should be understood by those skilled in the art that various modifications, combinations, sub-combinations, and alterations may occur depending on design requirements and other factors insofar as they are within the scope of the appended claims or the equivalents thereof.

What is claimed is:

1. An editing apparatus comprising:
a recording control section, which, when a predetermined command is received, exercises recording control as a process for the received command; and
a recording section configured to record at least two data packages on a predetermined recording medium under control of the recording control section,
wherein after a data package is recorded on the predetermined recording medium, during recording of another data package the recording control section determines whether the recording should finish at a time point of finishing the recording of the another data package,
when the result of the determination indicates that the recording should finish, the recording control section controls the recording section so as to finish the recording at an out point, and
when the result of the determination indicates that the recording should not finish, the recording control section controls the recording section to record a post-roll time period of data after the out point and then finish the recording, and
wherein a setup procedure for specifying whether or not to record the post-roll time period of data after the out point or to finish the recording at the out point is performed during recording of the another data package.

2. The editing apparatus according to claim 1, wherein the predetermined command is an AUTO EDIT command.

3. The editing apparatus according to claim 1, wherein the predetermined recording medium is a disk-shaped recording medium.

4. The editing apparatus according to claim 1, wherein the predetermined time period of data is postroll data.

5. The editing apparatus according to claim 1, wherein the recording control section determines in accordance with user-entered setup information whether the recording should finish, and includes
a user interface for allowing a user to enter setup information.

6. An editing method for use in an editing apparatus equipped with a recording section for recording at least two data packages onto a predetermined recording medium, the editing method comprising:
a recording control step of when a predetermined command is received, controlling a recording operation of the recording section as a process for the received command,
wherein the recording control step includes the steps of
after a data package is recorded on the predetermined recording medium, during recording of another data package, determining whether the recording should finish at a time point of finishing the recording of the another data package, and
controlling the recording section to finish the recording at an out point when the result of the determination indicates that the recording should finish, or controlling the recording section to record a post-roll time period of data after the out point and then finish the recording when the result of the determination indicates that the recording should not finish,
wherein a setup procedure for specifying whether or not to record the post-roll time period of data after the out point or to finish the recording at the out point is performed during recording the another data package.

7. A non-transitory computer readable medium for storing a program for a computer that controls a recording section to record at least two data packages onto a predetermined recording medium, the program comprising:
a recording control step of when a predetermined command is received, controlling a recording operation of the recording section as a process for the received command,
wherein the recording control step includes the steps of
after a data package is recorded on the predetermined recording medium, during recording of another data package, determining whether the recording should finish at a time point of finishing the recording of the another data package, and
controlling the recording section to finish the recording at an out point when the result of the determination indicates that the recording should finish, or controlling the recording section to record a post-roll time period of data after the out point and then finish the recording when the result of the determination indicates that the recording should not finish,
wherein a setup procedure for specifying whether or not to record the post-roll time period of data after the out point or to finish the recording at the out point is performed during recording of the another data package.

* * * * *